Oct. 9, 1951  A. F. O'CONNOR  2,570,370
SPRING DEVICE
Filed Feb. 23, 1946
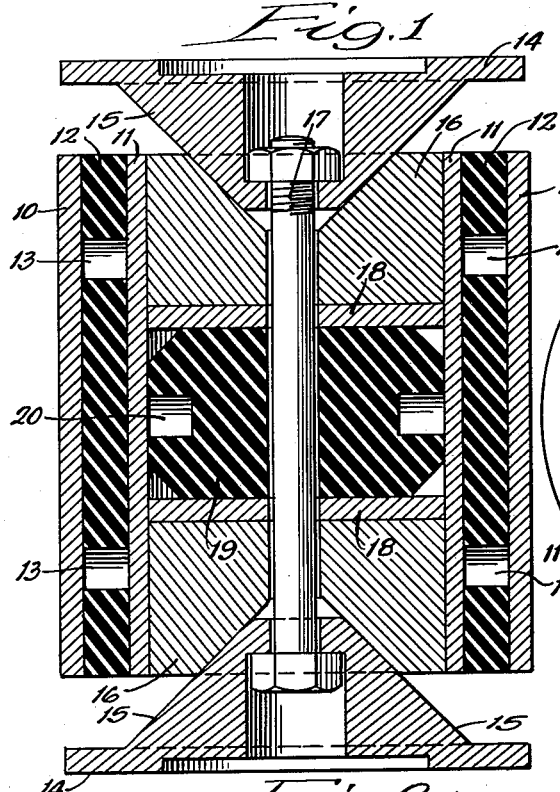
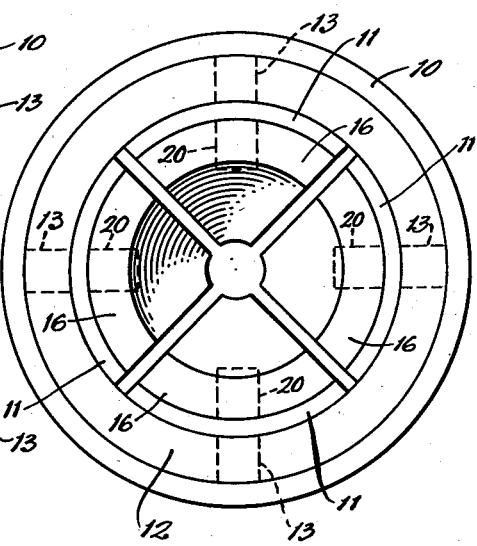
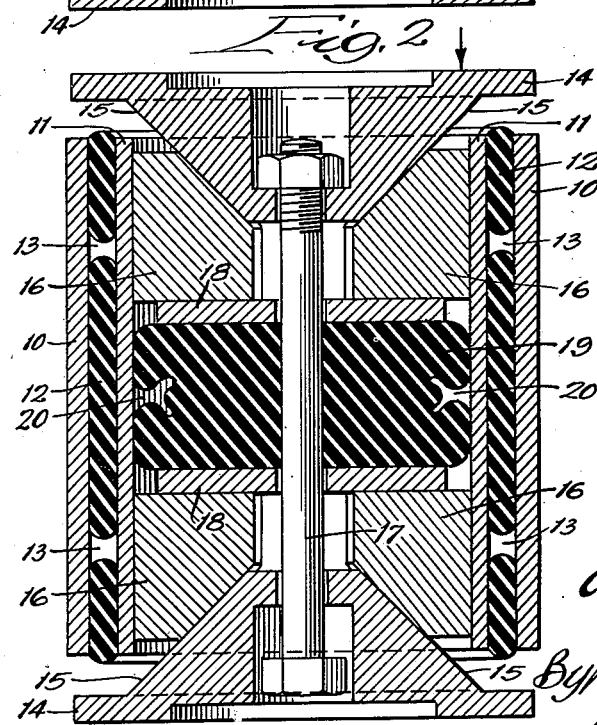
Inventor:
Arthur F. O'Connor,
By Davison, Brotherton Spangenberg,
Attorneys.

Patented Oct. 9, 1951

2,570,370

UNITED STATES PATENT OFFICE 2,570,370

SPRING DEVICE

Arthur F. O'Connor, Chicago, Ill., assignor to Union Asbestos & Rubber Company, a corporation of Illinois Application February 23, 1946, Serial No. 649,646

7 Claims. (Cl. 267—9)

This invention relates to spring devices and more particularly to combined spring and snubber units.

One of the objects of the invention is to provide a spring device in which a combined spring and snubber action is provided through the use of rubber or like resilient material in compression.

Another object is to provide a spring device in which movement of a plurality of segments in response to the cam effect of a load engaging member is resiliently opposed by rubber or the like.

Still another object is to provide a spring device in which the segments are loosely mounted and movement thereof in two directions in response to forces applied by load engaging members is resiliently opposed by rubber or the like.

The above and other objects and advantages of the invention will be more readily apparent from the following description when read in connection with the accompanying drawing, in which:

Figure 1 is an axial section through a spring device embodying the invention showing the parts in extended position;

Fig. 2 is a view similar to Fig. 1, showing the parts in compressed position; and Fig. 3 is an end elevation with the load engaging members removed.

The spring device as shown comprises an outer tubular housing 10 which may be of steel or like metal to provide the required strength. A slit sleeve 11 of smaller diameter than the housing is mounted within the housing with a cylindrical body of rubber 12 lying between and bonded to the housing and the sleeve. The rubber may, if desired, have openings or perforations formed therein, as indicated at 13, to increase its compressibility. The sleeve 11 is preferably divided into four sections, as shown in Fig. 3, to cooperate with four segments, as described hereinafter.

A pair of similar load engaging members 14 are mounted for axial movement into opposite ends of the tube 11. The members 14 are formed on their inner surface as cones 15 to engage sets of segments 16, shaped to provide conical end cavities. As shown, there are four segments 16 in each set to correspond to the sections of the tube 11. The segments 16 are of a size substantially to fill the tube 11, while being slidable axially therein in response to load forces. The load engaging members 14 are held against excessive separation by a bolt 17, extending throughout segments 16. Preferably, the head of the bolt and a nut on the opposite end of the bolt are set in cavities in the load engaging members 14 so that the load engaging members are held against separation but are permitted to move freely toward each other.

To prevent the sets of segments from moving together, they are fitted against annular discs 18 in the tube which are held separated by a block of rubber 19. As shown, the rubber block 19 may be cut away at its edges and may have openings 20 formed therein to provide space for flow of the rubber during compression.

The parts normally occupy the position shown in Fig. 1, in which the rubber sleeve 12 and the block 19 are not compressed and the sets of segments 16 lie adjacent the ends of the tube 11. When a compressive force is applied to the members 14, they move inwardly in the tube, acting through their conical surface 15 to move the segments 16 radially outward and, at the same time, to urge the sets of segments axially together in the tube. Axial movement of the segments is resisted by the rubber block 19 which will be compressed, as indicated in Fig. 2, to absorb a part of the load force. The camming action of the cones 15 spreads the segments causing them to separate the sections of the tube 11 so that the rubber sleeve 12 will also be compressed to absorb the other part of the load. Due to the action of the rubber bodies and to the friction between the cones 15 and segments 16 and between the segments 16 and tube 11, the device of the invention produces a very effective snubber action to prevent the development of harmonics in the spring system. While the spring device is capable of many uses, it may conveniently be used to replace one or more of the usual coil springs in a railway truck to prevent development of harmonics in the spring suspension system without interfering with the spring action. It may also be used as a friction draft gear for railway cars and like vehicles.

It will be understood that the device may be varied greatly, as to resistance to compression (load capacity), by the use of harder or softer rubber and by the use of a larger or smaller number of cavities, perforations or slots in the rubber to permit the rubber to flow.

With the present invention, the friction loads are distributed over a wide area in order to prevent concentrated wear at certain points to provide a device having long life. This friction occurs between members 14 and 16; 16 and 11 and between members 16 and 18 throughout a relatively wide total area.

While one embodiment of the invention has been illustrated and described in detail, it will be understood that this is illustrative only and is not to be taken as a definition of the scope of the invention, reference being had for this purpose to the appended claims.

What is claimed is:

1. A spring device comprising a tubular housing, a generally conical load engaging member movable axially into the housing, a plurality of annularly arranged segments slidable axially in the housing around the conical member to be cammed radially outward by the conical member, means including resilient material in the housing engaging the segments operative yieldingly to resist axial movement of said segments, and resilient material between the segments and the housing to resist outward movement of the segments.

2. A spring device comprising a tubular housing, a pair of generally conical load engaging members movable axially into the opposite ends of the housing, a pair of sets of segments slidable axially in the housing around the conical members respectively, a member defining a face to receive each set of said segments on the sides opposite said first members, means between the last named members operative to oppose axial shifting movements of said last named members and resilient material between the segments and the housing yieldingly to resist outward movement of the segments.

3. A spring device comprising a tubular housing, a pair of generally conical load engaging members movable axially into the opposite ends of the housing, a pair of sets of segments in the housing around the conical members respectively, a block of resilient material between the sets of segments yieldingly to oppose inward axial movement thereof, and resilient material between the segments and the housing yieldingly to resist outward movement of the segments.

4. A spring device comprising a tubular housing, a pair of generally conical load engaging members movable axially into the opposite ends of the housing, a pair of sets of segments in the housing around the conical members respectively, a tension member connecting the conical members to limit separation thereof while permitting them to move together, a block of resilient material between the sets of segments yieldingly to oppose inward axial movement thereof, and resilient material between the segments and the housing yieldingly to resist outward movement of the segments.

5. A spring device comprising a tubular housing, a tube in the housing axially split into a plurality of parts, a body of rubber between the housing and the tube bonded thereto, a pair of conical load engaging members movable axially into the opposite ends of the tube, a pair of sets of segments around the conical members respectively to be cammed outward thereby to move the tube parts outward as the conical members move into the tube, and resilient means between the sets of segments resiliently to oppose axial inward movements thereof.

6. A spring device comprising a tubular housing, a tube in the housing axially split into a plurality of parts, a body of rubber between the housing and the tube bonded thereto, a pair of conical load engaging members movable axially into the opposite ends of the tube, a pair of sets of segments around the conical members respectively to be cammed outward thereby to move the tube parts outward as the conical members move into the tube, and a block of resilient material between the sets of segments to resist axial inward movement thereof in the tube.

7. A spring device comprising a tubular housing, a tube in the housing axially split into a plurality of like parts, a tubular body of rubber between said housing and said tube and bonded thereto, a pair of conical load engaging members movable axially into the opposite ends of the tube, a pair of sets of segments having elements corresponding to each of said parts of said tube and disposed around said conical members between the tube and the conical members respectively to be cammed outward, thereby to move the tube parts radially outwardly as the conical members move into the tube, and means including a resilient block interposed between said sets of segments to resist inward axial movement thereof in the tube and defining friction surfaces against which said segments travel radially outwardly as said members move axially.

ARTHUR F. O'CONNOR.

REFERENCES CITED

The following references are of record in the file of this patent:

UNITED STATES PATENTS

| Number | Name | Date |
|---|---|---|
| 84,688 | Gardiner | Dec. 8, 1868 |
| 1,169,863 | Peycke | Feb. 1, 1916 |
| 1,176,723 | Schmidt | Mar. 21, 1916 |
| 1,290,307 | O'Connor | Jan. 7, 1919 |
| 1,713,914 | O'Connor | May 21, 1929 |
| 2,108,124 | Hobson | Feb. 15, 1938 |
| 2,137,152 | Blattner | Nov. 15, 1938 |
| 2,194,792 | Herndon | Mar. 26, 1940 |
| 2,265,392 | Olander | Dec. 9, 1941 |
| 2,289,790 | Light | July 19, 1942 |
| 2,446,164 | Willoughby | July 27, 1948 |

FOREIGN PATENTS

| Number | Country | Date |
|---|---|---|
| 553,606 | Great Britain | May 28, 1943 |